United States Patent Office 3,654,129
Patented Apr. 4, 1972

3,654,129
HYDROREFINING OF COKE-FORMING HYDROCARBON DISTILLATES
Herman S. Bloch, Skokie, Ill., assignor to Universal Oil Products Company, Des Plaines, Ill.
No Drawing. Continuation-in-part of application Ser. No. 742,503, July 5, 1968. This application Apr. 20, 1970, Ser. No. 30,313
Int. Cl. C10g 9/16, 23/00; C23f 14/00
U.S. Cl. 208—48   7 Claims

ABSTRACT OF THE DISCLOSURE

An olefin polymerization inhibitor is added to an unsaturated coke-forming hydrocarbon distillate prior to subjecting the same to hydrorefining, to retard the thermal polymerization chains sufficiently to insure formation only of soluble polymers and thereafter hydrogenating said soluble polymers in a hydrorefining (hydrogluation zone. Suitable inhibitors are selected from the group consisting of phenols, aromatic amines and thiophenols, and are employed in an amount of from 0.005% to 1.0% by weight of the hydrocarbonaceous charge stock.

RELATED APPLICATION

This present application is a continuation-in-part of my copending application, Ser. No. 742,503, filed July 5, 1968, now abandoned, all the teachings of which are incorporated herein by specific reference thereto.

APPLICABILITY OF INVENTION

The present invention relates to a process for hydrorefining hydrocarbons and mixtures of hydrocarbons, various hydrocarbon fractions and hydrocarbon distillates. More specifically, the invention described herein is directed toward an improvement in a process for effecting the hydrogenation of unsaturated coke-forming distillates containing mono-olefinic and di-olefinic hydrocarbons, which improvement inhibits the formation of coke and other heavy carbonaceous material otherwise resulting during processing.

In the present specification and appended claims, the terms, "hydrocarbons," "hydrocarbon fractions," "hydrocarbon distillate," and 'hydrocarbon mixture," are used interchangeably to connote synonymously various hydrocarbons and mixtures of hydrocarbons which may result from diverse conversion processes. Such conversion processes include catalytic and/or thermal cracking of petroleum, the destructive distillation of wood or coal, shale-oil retorting, naphtha pyrolysis schemes, etc. These hydrocarbon distillate fractions frequently contain impurities which must necessarily be removed before they become suitable for their intended use or which when removed, enhance the value of the distillate fraction for further processing. The more common impurities include sulfurous compounds, nitrogenous compounds, oxygenated compounds, and various metallic contaminants.

Probably the most prevalent of the aforementioned impurities is combined sulfur which may exist in the form of mercaptans, thiophenes, sulfides, etc. The combined sulfur is generally removed by the process of hydrodesulfurization, wherein the sulfur-bearing molecule is treated at an elevated temperature above a level of about 500° F., and usually about 700° F. The hydrodesulfurization reaction is effected in the presence of hydrogen and a suitable catalytic composite, the sulfur-bearing molecules being converted to hydrocarbons and hydrogen sulfide. The same treatment is effective in removing nitrogen-bearing molecules by converting them to hydrocarbons and ammonia. When existing in some combined form, oxygen is less of a removal problem than either sulfur or nitrogen; under the operating conditions employed, oxygenated compounds are readily converted to hydrocarbons and water.

In addition to the aforementioned contaminants, the hydrocarbon distillates resulting from the various conversion processes hereinbefore set forth, contain an appreciable quantity of unsaturated hydrocarbons, both mono-olefinic and di-olefinic, the latter including styrene, isoprene, dicyclopentadiene, etc. These unsaturated hydrocarbons impart coke-forming characteristics to the hydrocarbon distillates, and, when the latter are subjected to hydrodesulfurization for the purpose of removing sulfur, nitrogen and oxygen there is encountered the difficulty of effecting the desired degree of reaction due to the formation of coke and other carbonaceous material. The deposition of coke and other carbonaceous material appears to be an inherent result of the necessity to effect the hydrodesulfurization process at elevated temperatures, generally in excess of about 500° F. Various preheaters, and other appurtenances of the conversion zone experience heavy coking; this appears as a formation of solid, highly carbonaceous material resulting from the thermal reaction of the unstable or coke-forming compounds within the hydrocarbon distillate. In addition, polymerization and copolymerization reactions of the mono-olefins and di-olefins are effected within the hydrodesulfurization reaction zone, to the extent that the catalytic composite disposed therein becomes shielded from the material being processed.

As hereinbefore set forth, coke-forming hydrocarbon distillates are usually those resulting from prior severe conversion treatments, such as catalytic or thermal cracking or destructive distillation. These distillates are available in large quantities and generally require hydrodesulfurization treatment for the purpose of enhancing their further usefulness. In many instances, the hydrocarbon distillate will not contain excessive quantities of sulfurous and nitrogenous compounds, but will consist of detrimental amounts of mono-olefins and di-olefins, such that the subsequent use of the hydrocarbon fraction is prohibited. For example, in a thermal cracking process for ethylene production, a full boiling range hydrocarbon product results which may contain less than 1000 p.p.m. each of sulfur and/or nitrogen but will generally contain sufficient olefinic hydrocarbons to indicate a bromine number of the order of about 70.0, and di-olefins in an amount to indicate a diene value of the order of about 30.0, or more.

PRIOR ART

It must be recognized that published literature is replete with a wide variety of processes, both single- and multiple-stage, for effecting the removal of contaminants from various hydrocarbon charge stocks. No attempt will be made herein to describe these processes exhaustively. For the purposes of illustrating the prior art processes, for which my invention constitutes an improvement, it will suffice to describe in brief several which are considered exemplary.

U.S. Pat. No. 2,889,264 (Cl. 208–143) describes a two-stage process for the catalytic hydrogenation of a naphtha stock having deposit-forming tendencies. The stated object is to improve the feed stock to the extent that the same can be converted at elevated temperature without experiencing heat-exchanger fouling. The process is initially conducted at a temperature of 300° F. to 475° F. with little measurable reaction and little consumption of hydrogen. The effluent is subjected to conversion in a second zone at a temperature above 500° F. with reduced deposit-forming characteristics.

U.S. Pat. No. 3,114,701 (Cl. 208–254) concerns a single-stage process for effecting hydrodenitrification of various stocks intended for use in subsequent catalytic conversion processes. The charge stocks include straight-run and cracked distillates, naphthas, kerosenes, gas oils, etc. The process is effected at 500° F. to 800° F., at elevated pressure and in contact with a solid catalytic composite containing relatively large amounts of molybdenum and nickel. As set forth, this process is typical of the hydrorefining processes which utilize catalysts containing Group VI–B and iron-group metals in a single-stage reaction zone.

Another multiple-stage hydrorefining process is well defined in U.S. Pat. No. 3,215,618 (Cl. 208–143). This process is intended to be used for hydrorefining highly olefinic charge stocks, and is effective in inhibiting condensation and/or polymerization reactions which result in extensive coke deposition. Processes of the type described in the three foregoing patents are those to which my invention is specifically directed. Whether single-, or multiple-stage, effective, acceptable operation is significantly extended through the incorporation of the concept described herein.

In brief summation, the principal difficulty attendant the prior art processes involves the tendency of the mono-olefins and di-olefins to undergo extensive polymerization and co-polymerization, at the temperatures empolyed—i.e. 200° F. to 900° F.—the products of which are long chain in soluble polymers which must eventually be removed from the ultimate final product. While a multiple-stage process, such as that described in U.S. Pat. No. 3,215,618, tends to alleviate this undesirable situation, it must be borne in mind that the reactions being effected are principally exothermic, with the result that additional polymerization reactions are effected. Through the use of my invention, which is centered around the use of particular polymerization inhibitors, the thermal polymerization chains are retarded, particularly in the reaction zone, or zones, sufficiently, in the limited time available, to insure formation only of soluble polymers. These soluble, relatively short chain polymers, whether formed in the preheater reactions, or in the initial portion of the reaction zones, are readily hydrogenated into innocuous compounds. This not only improves the quality of the final product, but significantly decreases the degree to which coke and other carbonaceous material is formed in both the preheater and reaction zone sections as well as other attendant manifolding. One important result, which should immediately be recognized by those having expertise in the art, involves the additional, acceptable catalyst life, expressed as ° F. increase (to maintain the necessary degree of hydrogenation) per barrel of charge stock per pound of catalyst.

OBJECTS AND EMBODIMENTS

A principal object of my invention is to provide an improved process for hydrorefining coke-forming hydrocarbon distillates. A corollary objective is to improve both singe-stage and multiple-stage processes in order to lengthen the period of efficient, acceptable operation.

Another object resides in inhibiting excessive coke formation onto the catalytic composite and within the attendant manifolding of a hydrorefining process. Still another object is to provide a polymerization inhibitor capable of retarding the thermal polymerization chains sufficiently to insure formation only of soluble polymers which can then be hydrogenated.

In one embodiment, therefore, the present invention affords a process for hydrorefining an unsaturated, coke-forming hydrocarbon charge stock containing mono- and di-olefinic hydrocarbons, which process comprises admixing said charge stock with a polymerization inhibitor capable of retarding polymerization chains to the extent that soluble polymers are formed, reacting said charge stock and soluble polymers with hydrogen, in contact with a hydrorefining catalyst, and at hydrorefining conditions selected to hydrogenate said soluble polymers, mono- and di-olefinic hydrocarbons.

Other embodiments involve the use of particular concentrations of the polymerization inhibitor, generally within the range of from about 0.005% to about 1.0% by weight of the normally liquid hydrocarbonaceous charge stock, exclusive of any recycled liquid material, and particularly preferred compounds from the class of phenols, aromatic amines and thiophenols. The latter include N,-N'-di-sec-butyl phenylene diamine, butylated hydroxy-anisole, catechol, 2,6-di-tert-butyl, 4-methyl phenyl, and an N-alkyl-p-amino phenol in which the alkyl group contains from 1 to 20 carbon atoms.

From the foregoing embodiments, it will be readily ascertained that the present invention constitutes an improvement in the hydrorefining of unsaturated coke-forming hydrocarbon distillates, involving the utilization of one or more individual, distinctly separated reaction zones. Through the utilizatino of the present improvement the formation of insoluble, high molecular weight polymers and co-polymers, and the yield loss represented by the deposition of coke and other carbonaceous material is inhibited to a degree which permits economical acceptable processing for a significantly extended period of time.

Before describing my invention in greater detail, and presenting examples in further illustration thereof, a brief description of both the single-stage and multiple-stage process is believed warranted. The single-stage process is generally conducted by admixing hydrogen with normally liquid charge stock in an amount of 1000 to 10,000 c.f./bbl. thereof. Operating temperatures within the reaction zone are in the range of 500° F. to about 850° F., and the pressure is maintained at a level of 500 to 4000 p.s.i.g. by means of compressive hydrogen recycle. The liquid hourly space velocity (commonnly defined as volumes of liquid charge per hour per volume of catalyst within the reaction zone) is usually from 1.0 to about 10.0, although most reactions are effected at intermediate levels of 1.5 to about 3.5.

A multiple-stage process, for example having two separate reaction zones is effected in much the same manner with the exception of temperature levels in the two zones. The charge stock, in admixture with hydrogen, is passed into a first catalytic zone at a temperature such that the maximum catalyst temperature does not exceed about 500° F. or 550° F. The product effluent is then heated to a level such that the maximum catalyst temperature in the second reaction zone does not generally exceed about 900° F. In most two-stage processes, at least a portion of the normally liquid second reaction zone effluent is recycled to combine with the fresh charge stock in a combined feed ratio of about 1.5 to 6.0.

A perusal of the prior art processes indicates a preference for a catalytic composite of a suitable refractory inorganic oxide and at least one metallic component selected from the metals of Group VI–B and VIII of the Periodic Table, and compounds thereof. Refractory inorganic oxides include aluminia, silica, zirconia, hafnia, strontia, and mixtures thereof. The catalytically active metallic components, as shown in The Periodic Table of the Elements, E. H. Sargent and Co., 1964, are selected from molybdenum, chromium, tungsten, iron, cobalt, nickel, platinum, palladium, iridium, rhodium, osmium, ruthenium, and mixtures including molybdenum-nickel, nickel-tungsten and molybdenum-cobalt.

As hereinbefore set forth, the present invention improves the hydrorefining process, even when effected in multiple stages, by inhibiting the polymerization and co-polymerization of mono-olefinic and di-olefinic hydrocarbons to the extent that only soluble polymers are formed. This is accomplished through the use of an inhibitor for free-radical and/or thermal polymerization of olefins. The polymerization inhibitor is utilized in relatively small quantities, and generally in the range of from 0.005% to about 1.0% by weight of the hydrocarbon charge to the reaction zone. In a hydrorefining process conducted in two stages, or more, it may be desirable, depending upon the precise characteristics of the charge stock, to admix the inhibitor with normally liquid feed to each of the stages.

The polymerization inhibitor is selected from the group consisting of phenols, aromatic amines and thiophenols, and various substituted derivatives thereof. Thus, suitable polymerization inhibitors include p-phenylene diamine and N,N' - di - sec-alkyl-phenylene diamine derivatives, wherein the alkyl group contains 3 to about 20 carbon atoms; an example would be N,N'-di-sec-butyl phenylene diamine. Ortho, meta and para di-hydroxybenzenes, alkyl derivatives thereof wherein the alkyl group contains from one to twenty carbon atoms, an example of which is t-butyl catechol; tri-hydroxy benzenes and alkyl derivatives may also be used. Another example would be di-alkyl substituted para-di-hydroxybenzene, a specific example of which is butylated hydroxyanisole. Still other examples may be represented by the following general formula:

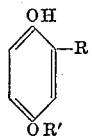

wherein R is an alkyl group having from three to twenty carbon atoms and R' is a straight-chain alkyl containing up to six carbon atoms. With mono-substituted alkyl phenols, the alkyl group, containing from three to twenty carbon atoms, can be substituted at any point in the ring. Alkyl thiophenols, containing one, two, or three alkyl groups, each having up to about twenty carbon atoms, are also suitable inhibitors for use herein.

Specific examples of tri-substituted phenols include 2,6-di-tert-butyl 4-methyl phenol and 2,4 - di-methyl 6 - tert-butyl phenol. Also suitable for use as a polymerization inhibitor are alkyl substituted p-amino phenols, wherein the alkyl group contains up to twenty carbon atoms; hydroxylated biphenyls, biphenyl-ethers, and biphenyl-sulfides, as well as their alkyl derivatives; alkylated naphthols, and the like.

Following a prolonged period of operation, when it appears that the catalyst has become deactivated to the extent that reactivation is desirable, the introduction of hydrocarbon charge stock is interrupted, but the operating pressure is maintained by continuing the circulation of the hydrogen-rich recycle gas stream. For the purpose of regeneration, the temperature is increased to a level within the range normally maintained within the reaction zone; that is, within the range of from about 500° to about 800° F. The circulating hydrogen-rich gas stream serves to strip the catalyst of the polymerization products formed during the period of operation, and effects such stripping in the relatively short period of from about eight to about twelve hours. In those instances where the catalytic deactivation appears to have resulted from the deposition of coke and carbonaceous material, such material may be effectively removed by burning in an atmosphere of air.

The following examples are given to illustrate further the process of the present invention, and to indicate the benefits afforded through the utilization thereof. It is not intended to limit unduly the process of the present invention to the charge stock, operating conditions, and/or inhibitor employed within these examples.

EXAMPLES

The tendency of a highly olefinic naphtha fraction to undergo coking is determined through the utilization of four different charge stocks. These are a thermally-cracked naphtha side-cut from a Michigan source, the same naphtha after depentanizing and rerunning, a coker distillate blend from an Ohio source and a catalytically-cracked gasoline fraction from a Pennsylvania source. All test runs are conducted utilizing a reaction zone packed with quartz chips. The liquid feed is introduced into the zone at a temperature of 550° F., a pressure of 700 p.s.i.g., a liquid hourly space velocity of 2.0 and with hydrogen in an amount of 9000 s.c.f./bbl. Each test is conducted for a period of nineteen hours. From the analysis for carbon on the "spent" quartz chips, coke deposition is calculated as pounds of carbon per 1000 barrels of feed.

Example I

In the absence of any inhibitor, the processing of thermally-cracked naphtha side-cut produces coke in an amount of 29.4 lbs./1000 bbl. With 0.02% by weight of N,N'-di-sec-butyl-phenylene diamine, this decreases to 3.3 lbs./1000 bbl.

Example II

The processing of the depentanized and rerun thermally-cracked naphtha side-cut, without an inhibitor, produces 12.9 lbs./1000 bbl. In the presence of 0.02% by weight of N,N'-di-sec-butyl-phenylene diamine, the carbon deposition decreases to 1.5 lbs./1000 bbl.

Example III

The coke distillate blend produces coke in an amount of 33.9 lbs./1000 bbl. without the benefit of an inhibitor. Using 0.02% by weight of N,N'-di-sec-butyl-phenylene diamine as the inhibitor, the carbon deposition decreases to 4.0 lbs./1000 bbl. The effect of adding 0.02% by weight of N,N'-di-sec-butyl-phenylene diamine to the catalytically-cracked gasoline fraction is to decrease the carbon deposition from 8.9 lbs./1000 bbl. to a level of only 0.8 lb./1000 bbl.

Example IV

With 0.3% by weight of catechol added to the thermally-cracked naphtha side-cut, the carbon deposition decreases to 3.0 lbs./1000 bbl. from 29.4 lbs./1000 bbl. Adding 0.05% by weight of butylated hydroxyanisole, the carbon deposition decreases to 2.5 lbs./1000 bbl.

DESCRIPTION OF A PREFERRED EMBODIMENT

This illustration of a preferred embodiment will be described in conjunction with a commercially-scaled unit having a design capacity of about 15,000 bbl./day. The charge stock is a fluid coker gasoline having a gravity of about 46.0° API, an initial boiling point of about 155° F., a 50.0% volumetric distillation temperature of about 296° F. and an end boiling point of about 475° F. Contaminating influences include 1.14% by weight of sulfur and about 100 p.p.m. by weight of nitrogen; significant unsaturation is indicated by a bromine number of about 90 and a diene value of about 13. The intended object is the maximum production of a charge stock suitable as fresh feed to a catalytic reforming process. The hydrogenation process is effected in two stages; the first reaction zone contains a catalytic composite of ⅛-inch x ⅛-inch cylindrical alumina pills which have been impregnated with about 2.2% by weight of cobalt and 5.7% by weight of molybdenum. The catalyst which is disposed within the second reaction zone are 1/16 spherical particles of an alumina-silica carrier, containing 12.0% by weight of silica, with which is combined 0.05% by weight of cobalt, 4.2% by weight of nickel and 11.3% by weight of molybdenum.

The charge stock, in an amount of 11,000 bbl./day is admixed with about 3,300 bbl./day of a diluent recycled from the second stage effluent to provide a combined liquid feed ratio of about 1.3. Catechol, in an amount of about 0.20% by weight of fresh feed charge stock only, is admixed with the liquid charge and introduced into the first reaction zone at a pressure of about 790 p.s.i.g. The hydrogen concentration is about 1,300 s.c.f./bbl., the liquid hourly space velocity (on fresh feed only) is 2.5 and the catalyst bed inlet temperature is about 360° F.

Hydrogen consumption in this first stage is 0.20% by weight of fresh feed, or about 108 s.c.f./bbl.

The temperature of the product effluent, 460° F., is increased to a level of 600° F., and the effluent is passed into the second stage after the addition thereto of an additional 0.15% by weight of catechol (based only on fresh feed). The operating pressure is about 765 p.s.i.g., the liquid hourly space velocity is about 2.5 based upon fresh feed exclusive of recycle and the hydrogen concentration is about 3,000 s.c.f./bbl. The product effluent is used as a heat-exchange medium and further cooled and condensed to a temperature of about 100° F. The cooled effluent enters a cold separator at 750 p.s.i.g. which serves to provide a hydrogen-rich gaseous phase which is in part recycled to both reaction zones. Additional hydrogen consumption amounts to 1.42% by weight of the 11,000 bbl./day of fresh feed, or 749 s.c.f./bbl. Overall product yield and distribution is presented in the following table:

TABLE.—HYDROREFINING YIELDS AND PRODUCT DISTRIBUTION

| Component | Wt. percent | Vol. percent |
|---|---|---|
| Ammonia | 0.01 | |
| Hydrogen sulfide | 1.21 | |
| Methane | 0.05 | |
| Ethane | 0.16 | |
| Propane | 0.32 | |
| Butanes | 0.52 | 0.72 |
| Pentanes | 0.65 | 0.82 |
| Hexane-plus | 98.70 | 102.65 |

The hexane-plus portion of the product effluent has a gravity of 53.1° API, and contains less than 1.0 p.p.m. of both sulfur and nitrogen. Both the bromine number and the diene value are essentially "nil." At a catalyst life of 100 bbl./lb. for the first reaction zone, and 120 bbl./lb. for the second reaction zone, it is necessary only to increase the catalyst bed inlet temperatures to 450° F. and 700° F. respectively. In the absence of the polymerization inhibitor, these increased temperature levels are attained at about 80 bbl./lb. and 96 bbl./lb. respectively. Considering only the second stage catalyst, the stability, in the absence of catechol is 100° F./80 bbl./lb., or 1.25° F./bbl./lb., as compared to 0.833° F./bbl./lb. when catechol is added to the feed.

The foregoing specification and examples clearly indicate the method of effecting the present invention, and illustrate the benefits to be afforded through the utilization thereof.

I claim as my invention:

1. A process for hydrorefining an unsaturated, coke-forming hydrocarbon charge stock containing mono- and di-olefinic hydrocarbons, which comprises admixing said charge stock with a polymerization inhibitor selected from the group consisting of phenols, aromatic amines and thiophenols in an amount effective to increase catalyst life and reduce fouling of equipment by retarding polymerization chains to the extent that there are formed during the hydrorefining only short chain polymers which are soluble in a liquid phase of said charge stock, contacting said charge stock and hydrogen with a hydrorefining catalyst at hydrorefining conditions selected to maintain a liquid phase of said charge stock and to hydrogenate mono- and di-olefinic hydrocarbons in the charge stock and said polymers formed during said contacting.

2. The process of claim 1 further characterized in that said polymerization inhibitor is added to said charge stock in an amount of from about 0.005% to about 1.0% by weight.

3. The process of claim 1 further characterized in that said polymerization inhibitor is butylated hydroxyanisole.

4. The process of claim 1 further characterized in that said polymerization inhibitor is catechol.

5. The process of claim 1 further characterized in that said catalyst contains at least one metallic component from the metals of Groups VI–B or VIII.

6. The process of claim 5 further characterized in that said catalyst contains from 1.0% to about 10.0% by weight of an iron-group metal component and from 4.0% to about 30.0% by weight of a Group VI–B metal component combined with a porous carrier material.

7. The process of claim 6 further characterized in that said porous carrier material is siliceous.

References Cited
UNITED STATES PATENTS

| | | | |
|---|---|---|---|
| 3,494,857 | 2/1970 | McIlvried et al. | 208—143 |
| 3,556,983 | 1/1971 | Kronig et al. | 208—27 |
| 3,342,723 | 9/1967 | Godar | 208—48 |
| 3,498,908 | 3/1970 | Frankovich | 208—112 |
| 3,170,865 | 2/1965 | Allen et al. | 208—48 |
| 3,366,702 | 1/1968 | Moriarity | 260—679 |
| 3,496,095 | 2/1970 | Lewis | 208—57 |
| 3,498,907 | 3/1970 | Doelp et al. | 208—57 |
| 3,132,085 | 5/1964 | Summers | 208—48 |

DELBERT E. GANTZ, Primary Examiner

G. E. SCHMITKONS, Assistant Examiner

U.S. Cl. X.R.

203—9; 208—89, 144, 255